United States Patent [19]

Jardin

[11] 4,081,194
[45] Mar. 28, 1978

[54] WIND DEFLECTOR ARRANGEMENT ON A MOTOR VEHICLE ROOF

[75] Inventor: Hans Jardin, Inning, Germany

[73] Assignee: Webasto-Werk W. Baier GmbH & Co., Germany

[21] Appl. No.: 767,321

[22] Filed: Feb. 10, 1977

[30] Foreign Application Priority Data

Feb. 26, 1976 Germany .............................. 2607816

[51] Int. Cl.² ............................ B60J 1/20; B60J 7/22
[52] U.S. Cl. ...................................... 296/1 S; 296/91; 296/137 J
[58] Field of Search ............. 296/1 S, 91, 84 R, 137 J

[56] References Cited

U.S. PATENT DOCUMENTS

| 3,311,406 | 3/1967 | Fritsch | 296/11 |
| 3,368,841 | 2/1968 | Grau | 296/91 |
| 3,904,239 | 9/1975 | Jardin | 296/137 J |
| 3,922,032 | 11/1975 | Schuller | 296/137 J |

FOREIGN PATENT DOCUMENTS

| 94,727 | 3/1958 | Netherlands | 296/137 J |
| 79,778 | 10/1954 | Netherlands | 296/137 J |

*Primary Examiner*—Philip Goodman
*Attorney, Agent, or Firm*—Craig & Antonelli

[57] ABSTRACT

A wind deflector arrangement for a motor vehicle roof of the type having a roof cutout closeable by a rigid sliding cover is provided. The wind deflector is mounted along its forward edge of the roof cutout and pivotable and about an axis located transverse to the longitudinal axis of the vehicle. Lever arms are provided at each lateral side of the sliding cover and extend from a pivot connection at the sliding cover to a frame part surrounding the roof cutout. A spring is provided which biases the wind deflector to pivot about the transverse axis. In order to minimize the lateral dimensions of the wind deflector arrangement, the lever arms are disposed directly underneath guide shoes for the sliding cover. The forward portion of the guide frame for the guide shoes of the sliding cover is cut away in the position above these lever arms so that the guide shoe rides on the lever arm to close the wind deflector when the sliding cover is moved to the closed position.

8 Claims, 4 Drawing Figures

WIND DEFLECTOR ARRANGEMENT ON A MOTOR VEHICLE ROOF

BACKGROUND AND SUMMARY OF THE INVENTION

The invention relates to a wind deflector arrangement on a motor vehicle panel with a panel cut out, preferably a roof with a roof cutout, said cutout being closeable by a rigid sliding cover, the wind deflector being mounted along the front edge of the roof cutout and swivelable on an axis located crosswise to the longitudinal axis of the vehicle, said wind deflector further being connected at each end with a lever arm rotatably mounted in a lateral part of the roof frame, said wind deflector being raised by spring force when the sliding cover is opened and lowered when the sliding cover is closed, by virtue of a member connected with the sliding cover running on the lever arm, said sliding cover being guided on both sides by a forward guide shoe running in a track mounted laterally in the roof frame, said guide shoe being connected with the sliding cover by a guide shoe bracket.

In known wind deflector arrangements of this kind, the lever arms of the wind deflector are mounted laterally beside the guide tracks for the guide shoes and are pressed downward when the sliding roof is closed by plastic projections provided on the lower side of the sliding cover, in order to fold down the wind deflector. The disadvantage of this known arrangement is that the lever arms require the guide tracks for the guide shoes of the sliding cover to be displaced relatively far inward, resulting in a reduction of the width of the roof cutout.

An object of the invention is to provide a wind deflector arrangement in which the actuating device for the wind deflector ideally requires no additional space in the sidewise direction, so that a roof cutout of maximum width can be provided for a given width of the sliding cover.

This object is achieved according to the invention by mounting the lever arm below the guide shoe bracket in the slide path of the guide shoe.

This proposal according to the invention means that the actuating mechanism for the wind deflector is no longer located laterally outside the guide shoes and guide shoe tracks, but essentially in the same planes, so that no additional lateral space is required for actuating the wind deflector. Hence, the roof cutout can have an optimum width.

The lever arms, and the wind deflector connected therewith, are preferably lowered by the forward guide shoes themselves, said shoes running on the tops of the lever arms, when the sliding cover is closed. This eliminates the need for additional members such as the plastic projections in known designs.

Preferably the tracks guiding the guide shoes are given a form which is U-shaped in cross section, open at the sides with horizontal legs. With this arrangement it is advantageous for the lower leg of the track in the vicinity of the lever arm to be replaced by the top of the lever arm. That is, the top of the lever arm serves to resiliently guide the lower part of the guide shoes as the sliding cover approaches its closed position.

These and other objects, features and advantages of the present invention will become more apparent from the following description when taken in connection with the accompanying drawings, which show, for purposes of illustration only, a single embodiment in accordance with the present invention.

DETAILED DESCRIPTION OF THE DRAWINGS

Figure 1:
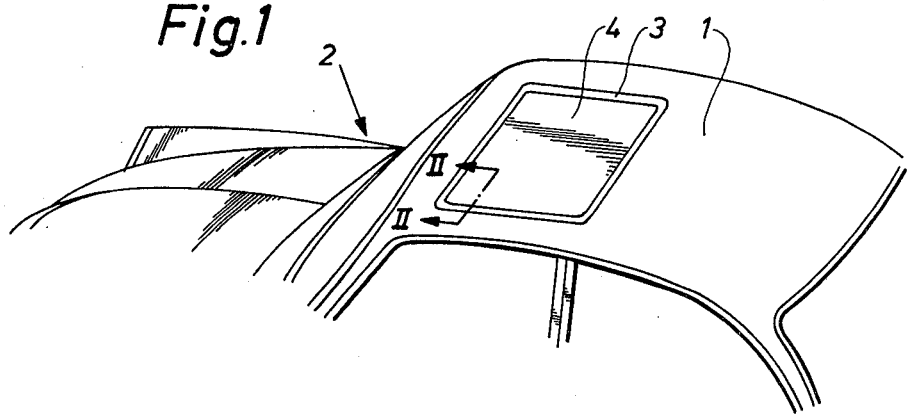
FIG. 1 is a top schematic view of a motor vehicle with a rigid sliding cover according to the present invention.

Roof 1 of a motor vehicle 2 is provided with a roof cutout 3 closeable by a rigid sliding cover 4. Roof cutout 3 is surrounded at the front and along the sides by a roof frame 5 provided with lateral tracks 6 extending lengthwise with respect to the vehicle, with sliding cover 4 guided in said tracks by forward guide shoes 7. Each guide shoe 7 is connected to sliding cover 4 by a guide shoe bracket 8. Roof frame 5 is U-shaped in cross section, with an outer vertical leg 9 and an inner vertical leg 10. Track 6 is likewise U-shaped in cross section and has an upper leg 11 and a lower leg 12, between which guide shoe 7 is guided.

A wind deflector 15 is swivelably mounted on an axis 16 located crosswise to the longitudinal axis of the vehicle, and is mounted on the forward part of sliding roof frame 5. Wind deflector 15 is provided at its ends with extensions 17, said extensions extending downward when the wind deflector is folded down, said extensions each being provided with an elongated hole 18 and with lateral lever arms 19. Each lever arm 19 is provided at its forward end with a pin 20, said pin fitting into elongated hole 18 of the corresponding extension 17, while its other end 21 is rotatably mounted in a bracket mounted on sliding roof frame 5.

Figure 3:
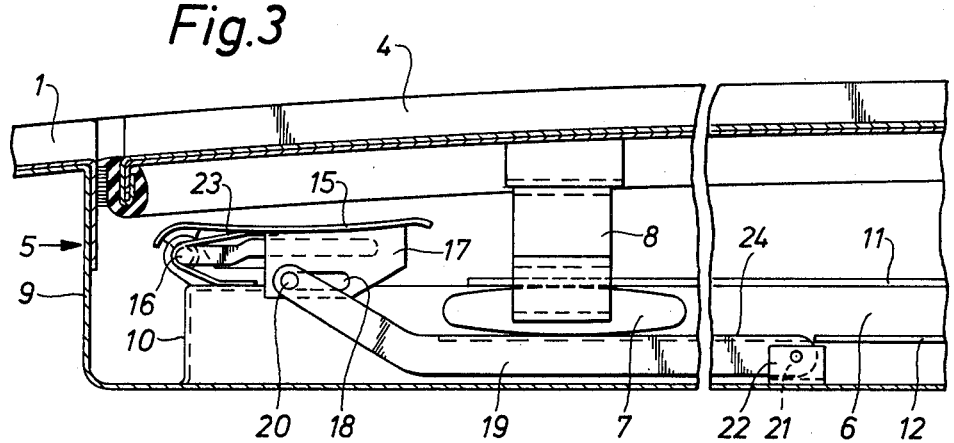
FIG. 3 is a cross sectional view along line III—III in FIG. 2.
Figure 4:
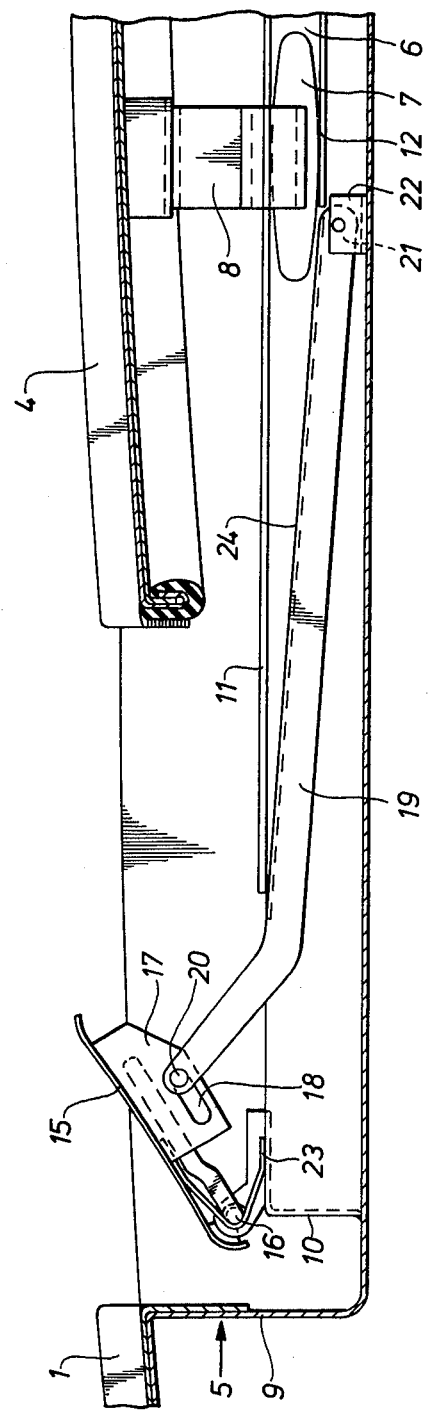
FIG. 4 is a cross sectional view similar to FIG. 3, but showing the sliding cover pulled back and the wind deflector raised.

With sliding cover 4 slid back as shown in FIG. 4, wind deflector 15 is automatically raised by springs 23 to the raised position shown in FIG. 4. In order to ensure that wind deflector 15 is folded down at the proper time when sliding cover 4 is closed, i.e., as it moves from the position shown in FIG. 4 leftward to the position shown in FIG. 3, lever arms 19 are disposed in the guide area of forward guide shoes 7 in such manner that the lever arms 19 are depressed by them, thereby folding down the wind deflector against the action of springs 23.

As shown particularly in FIGS. 3 and 4, the lower leg 12 of lateral track 6 is cut away in the vicinity of lever arm 19. In this area, the guide shoe 7 is supported from below by the top 24 of lever arm 19, when sliding cover 4 is slid from an open position to the closed position. The guidance of the guide shoe and hence of the sliding cover is in no way affected thereby, since the upper support by the upper leg 11 of track 6 remains unaffected and lever arm 19 is pressed against guide shoe 7 by spring 23, so that said guide shoe 7 is held under spring tension between the upper leg 11 of track 6 and lever arm 19.

Figure 2:
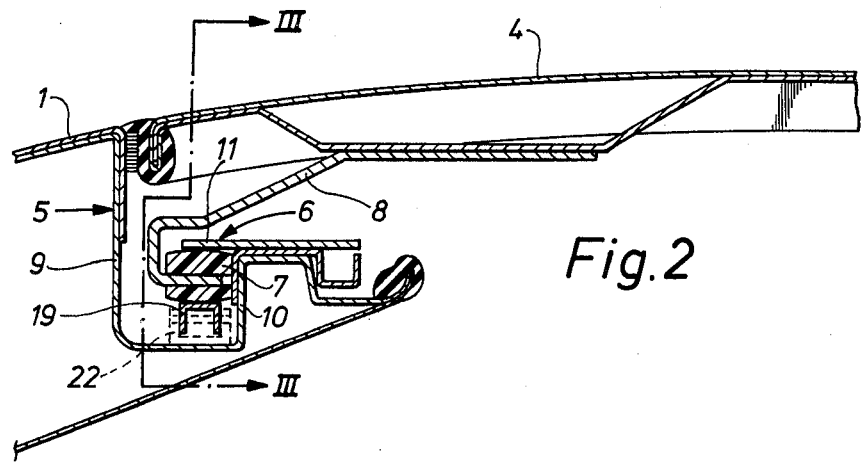
FIG. 2 is a cross sectional view along line II—II in FIG. 1.

The arrangement of lever arm 19 below lateral track 6, shown particularly in FIG. 2, results in an especially compact design, especially as far as the room required at the sides is concerned. This makes it possible to increase the width of the open roof cutout by more than 4 cm by comparison with conventional designs using wind deflector arms mounted laterally beside the guide tracks. The greater vertical extent of the roof frame, required by the arrangement of the wind deflector according to the invention, is not disadvantageous in the embodiments contemplated since sufficient space is available in this direction.

While we have shown and described only a single embodiment in accordance with the present invention, it is understood that the same is not limited thereto but is susceptible of numerous changes and modifications as would be known to those skilled in the art, given the present disclosure, we therefore do not wish to be limited to the details shown and described herein but intend to cover all such changes and modifications as are encompassed by the scope of the appended claims.

I claim:

1. Wind deflector arrangement in a motor vehicle panel with a panel cutout, closeable by a sliding cover, with the wind deflector mounted along the forward edge of the panel cutout and swivelable around an axis located crosswise to the longitudinal axis of the vehicle, said wind deflector being connected with lever arm means rotatably mounted in a lateral panel support frame part, said wind deflector being raised by spring force when the sliding cover is opened and lowered when the sliding cover is closed by having a member connected with the sliding cover running on the lever arm means, a track mounted in the panel support frame, said sliding cover being guided in said track by means of a forward guide shoe, said shoe being connected with the sliding cover by a guide shoe bracket, said lever arm means being mounted below the guide shoe bracket in the slide path of the guide shoe.

2. Wind deflector arrangement according to claim 1, wherein said vehicle panel is a vehicle roof and said panel cutout is a roof cutout.

3. Wind deflector arrangement according to claim 1, wherein said sliding cover is rigid.

4. Wind deflector arrangement according to claim 2, wherein said lever arm means includes a lever at each lateral end of said wind deflector, wherein said sliding cover is guided on both sides in a respective lateral track mounted in the roof frame by means of respective forward guide shoes, each of said shoes being connected with the sliding cover by guide brackets, said levers of said lever arm means being mounted below the respective guide shoe brackets in the slide path of the respective associated guide shoes.

5. Wind deflector arrangement according to claim 3, wherein said vehicle panel is a vehicle roof and said panel cutout is a roof cutout.

6. Wind deflector arrangement according to claim 4, wherein said sliding cover is rigid.

7. Wind deflector arrangement according to claim 1, in which the track guiding the guide shoe is U-shaped in cross section and has legs extending horizontally, and wherein the lower leg of track is cut away in the area of the lever arm and is replaced by the top of said lever arm.

8. Wind deflector arrangement according to claim 7, wherein said lever arm means includes a lever at each lateral end of said wind deflector, wherein said sliding cover is guided on both sides in a respective lateral track mounted in the roof frame by means of respective forward guide shoes, each of said shoes being connected with the sliding cover by guide brackets, said levers of said lever arm means being mounted below the respective guide shoe brackets in the slide path of the respective associated guide shoes.

* * * * *